United States Patent
Wurz et al.

(10) Patent No.: US 6,775,012 B2
(45) Date of Patent: Aug. 10, 2004

(54) SYSTEM FOR DIMENSIONING OBJECTS USING AT LEAST ONE LIGHT BEAM OFFSET RELATIVE TO A PERPENDICULAR FROM AN OBJECT SUPPORTING SURFACE

(75) Inventors: Albert Wurz, Doylestown, PA (US); John E. Romaine, Bethlehem, PA (US); David L. Martin, Ewing, NJ (US)

(73) Assignee: Accu-Sort Systems, Inc., Telford, PA (US)

( * ) Notice: Subject to any disclaimer, the term of this patent is extended or adjusted under 35 U.S.C. 154(b) by 0 days.

(21) Appl. No.: 09/766,815

(22) Filed: Jan. 22, 2001

(65) Prior Publication Data

US 2002/0001091 A1 Jan. 3, 2002

Related U.S. Application Data

(63) Continuation of application No. 08/918,196, filed on Aug. 25, 1997, now Pat. No. 6,177,999, which is a continuation of application No. 08/459,342, filed on Jun. 2, 1995, now Pat. No. 5,661,561.

(51) Int. Cl.[7] .............................................. G01B 11/14
(52) U.S. Cl. ...................................... 356/608; 356/623
(58) Field of Search ................................ 356/601–623, 356/634–640, 429–431, 625, 629; 250/559.19, 223 R, 559.22, 559.24, 559.25, 559.27, 559.05, 559.06, 559.35

(56) References Cited

U.S. PATENT DOCUMENTS

| | | | |
|---|---|---|---|
| 3,744,915 A | * | 7/1973 | Sick |
| 3,866,038 A | * | 2/1975 | Korth .......................... 250/236 |
| 4,063,820 A | | 12/1977 | Borgese |
| 4,105,925 A | | 8/1978 | Rossol et al. |
| 4,158,507 A | | 6/1979 | Himmel |
| 4,171,917 A | * | 10/1979 | Pirlet .......................... 356/376 |
| 4,227,812 A | | 10/1980 | Pirlet |
| 4,227,813 A | | 10/1980 | Pirlet |
| 4,411,528 A | | 10/1983 | Newcomb et al. |
| 4,492,472 A | | 1/1985 | Asano et al. |
| 4,627,734 A | * | 12/1986 | Rioux .......................... 356/607 |
| 4,632,546 A | * | 12/1986 | Sick et al. ............... 356/237.5 |
| 4,645,917 A | | 2/1987 | Penney et al. |
| 4,741,621 A | | 5/1988 | Taft et al. |
| 4,758,093 A | | 7/1988 | Stern et al. |
| 4,758,730 A | | 7/1988 | Brazin et al. |
| 4,773,029 A | | 9/1988 | Claesson et al. |
| 4,794,262 A | | 12/1988 | Sato et al. |
| 4,812,639 A | | 3/1989 | Byren et al. |
| 4,825,091 A | | 4/1989 | Breyer et al. |
| 4,866,288 A | * | 9/1989 | Weber ................... 250/559.49 |

(List continued on next page.)

FOREIGN PATENT DOCUMENTS

| | | |
|---|---|---|
| GB | 2189594 | 10/1987 |
| JP | 53143257 | 12/1978 |
| JP | 63108208 | 5/1988 |
| JP | 63195514 | 8/1988 |
| JP | 2110789 | 10/1988 |
| JP | 723309 | 9/1993 |
| WO | 9427166 | 11/1994 |
| WO | 9612931 | 5/1996 |

OTHER PUBLICATIONS

Sales Brochure and entitled "Space–Weigh"® 1000 Dimension and Weigh System by Mettler Toledo.
Copy of translated International Preliminary Examination Report for PCT/EP00/10465.

*Primary Examiner*—Hoa Q. Pham
(74) *Attorney, Agent, or Firm*—Volpe and Koenig, P.C.

(57) ABSTRACT

The present invention provides a dimensioning system for determining the minimum size box necessary to enclose an object traveling on a moving conveyor. The dimensioning system is comprised of a light source which generates a scan beam that is moved by a mirrored wheel. A line scan camera whose field of view tracks the moving scan beam receives images of the scan beam and outputs a signal which is processed to compute a three dimensional box structure of the scanned object.

19 Claims, 8 Drawing Sheets

U.S. PATENT DOCUMENTS

| | | | |
|---|---|---|---|
| 4,885,461 A | 12/1989 | Matila et al. | |
| 4,891,530 A | 1/1990 | Hatji | |
| 4,906,098 A | 3/1990 | Thomas et al. | |
| 4,929,843 A | 5/1990 | Chmielewski, Jr. et al. | |
| 4,939,379 A | 7/1990 | Horn | |
| 4,965,665 A * | 10/1990 | Amir | 382/154 |
| 4,989,981 A | 2/1991 | Kawamura et al. | |
| 4,996,440 A * | 2/1991 | Nordbryhn | 250/561 |
| 5,004,929 A * | 4/1991 | Kakinoki et al. | 356/376 |
| 5,085,516 A | 2/1992 | Bertrand et al. | |
| 5,125,741 A * | 6/1992 | Okada et al. | 356/237 |
| 5,193,120 A | 3/1993 | Gamache et al. | |
| 5,200,799 A | 4/1993 | Maruyama et al. | |
| 5,383,022 A * | 1/1995 | Kaser | 356/387 |
| 5,416,591 A | 5/1995 | Yoshimura et al. | |
| 5,457,537 A * | 10/1995 | Richter | 356/372 |
| 5,555,090 A * | 9/1996 | Schmutz | 356/381 |
| 5,661,561 A * | 8/1997 | Wurz et al. | 356/386 |
| 5,777,746 A * | 7/1998 | Dlugos | 356/380 |
| 5,900,611 A * | 5/1999 | Hecht | 235/454 |
| 6,177,999 B1 * | 1/2001 | Wurz et al. | 356/386 |
| 6,504,147 B1 * | 1/2003 | Ito et al. | 250/234 |

* cited by examiner

SYSTEM FOR DIMENSIONING OBJECTS USING AT LEAST ONE LIGHT BEAM OFFSET RELATIVE TO A PERPENDICULAR FROM AN OBJECT SUPPORTING SURFACE

CROSS REFERENCE TO RELATED APPLICATIONS

This application is a continuation of U.S. patent application Ser. No. 08/918,196, filed Aug. 25, 1997, now U.S. Pat. No. 6,177,999 which is a continuation of U.S. patent application Ser. No. 08/459,342, filed Jun. 2, 1995, now U.S. Pat. No. 5,661,561.

BACKGROUND OF THE INVENTION

1. Field of the Invention

The present invention relates to an apparatus for determining the dimensions of an object. More particularly, it relates to a dimensioning apparatus for determining the minimum size box necessary to enclose an object. Most particularly, the invention is directed to an automatic dimensioning system which accurately determines the dimensions of an object on a moving conveyor for package sorting and handling applications.

2. Description of the Prior Art

In order to reduce costs and increase the volume of packages handled, the shipping industry has pressed automated package handling. This has been accomplished through automated package identification by bar code labeling and automated sortation by scanners identifying the labels and routing the packages. Package sorting is typically done based on the package size. In the shipping industry, shipping fees are directly related to the package size, weight and shipping destination. Determining the correct package size in an efficient manner is therefore especially significant for both throughput and fee calculation.

While some progress has been made to provide automated systems for creating a three dimensional rendering of the package, the known systems are both complex and costly. There are several known systems for obtaining package dimensions. One system, shown in U.S. Pat. No. 5,193,120, utilizes a light source which projects collimated lines of light onto the object to be measured. An imaging system, utilizing a video camera, views the object at an angle with respect to the structured light so that the profile of the object can be visualized. The video signal is processed to calculate the three dimensional rendering of the object based on the lines of light.

Another system, shown in International Publication Number WO 94/27166, uses a laser beam which is reflected in a fan shaped form and directed using mirrors to a flat surface. The laser beam is oscillated at a high frequency where the difference in phase between the originating beam and the reflected light off of the surface of an object yields the height of the object. The system calculates the time it takes for the light beam to travel to and from the object. The system is mounted in a moveable carriage which passes over the object and after a multiplicity of height measurements determines the dimensions of the object.

U.S. Pat. No. 4,758,093 discloses a three-dimensional measurement system which uses a holographic scanning mechanism. Triangulation based upon the projector to camera and relative angles provides the foundation for computing the surface coordinates.

An apparatus which determines an object's height is shown in U.S. Pat. No. 4,929,843. This system utilizes a laser beam which is rastered across a conveyor surface creating a light stripe. A television camera, having a defined field of view, views the object at an angle causing the apparent location of the light stripe to move based on the object height.

Although the known systems can be used to obtain an object's height or to provide a three dimensional rendering, both systems view the object area at an angle, then produce a large analog video signal which must be filtered and processed. In order to increase the efficiency and reduce the cost of a dimensioning system, it is desirable to have a low cost, automated means for providing an accurate, high speed rendering of an article as it is carried on a conveyor. This object can be accomplished by reducing the amount of visual data processed.

SUMMARY OF THE INVENTION

The present invention provides a dimensioning system for determining the minimum size box necessary to enclose an object traveling on a moving conveyor. The dimensioning system is comprised of a light source which generates a scan beam that is moved by a mirrored wheel. A line scan camera whose field of view is also moved by the mirrored wheel receives images of the scan beam and outputs a serial analog waveform which is processed to compute a three dimensional box structure of the scanned object. Further processing is necessary for those objects that have complex curves.

It is an object of the invention to provide a dimensioning system which scans a three dimensional object on a moving conveyor belt and calculates a box capable of enclosing the object.

Other objects and advantages of the system will become apparent to those skilled in the art after reading the detailed description of a presently preferred embodiment.

DESCRIPTION OF THE PREFERRED EMBODIMENTS

Figure 1:
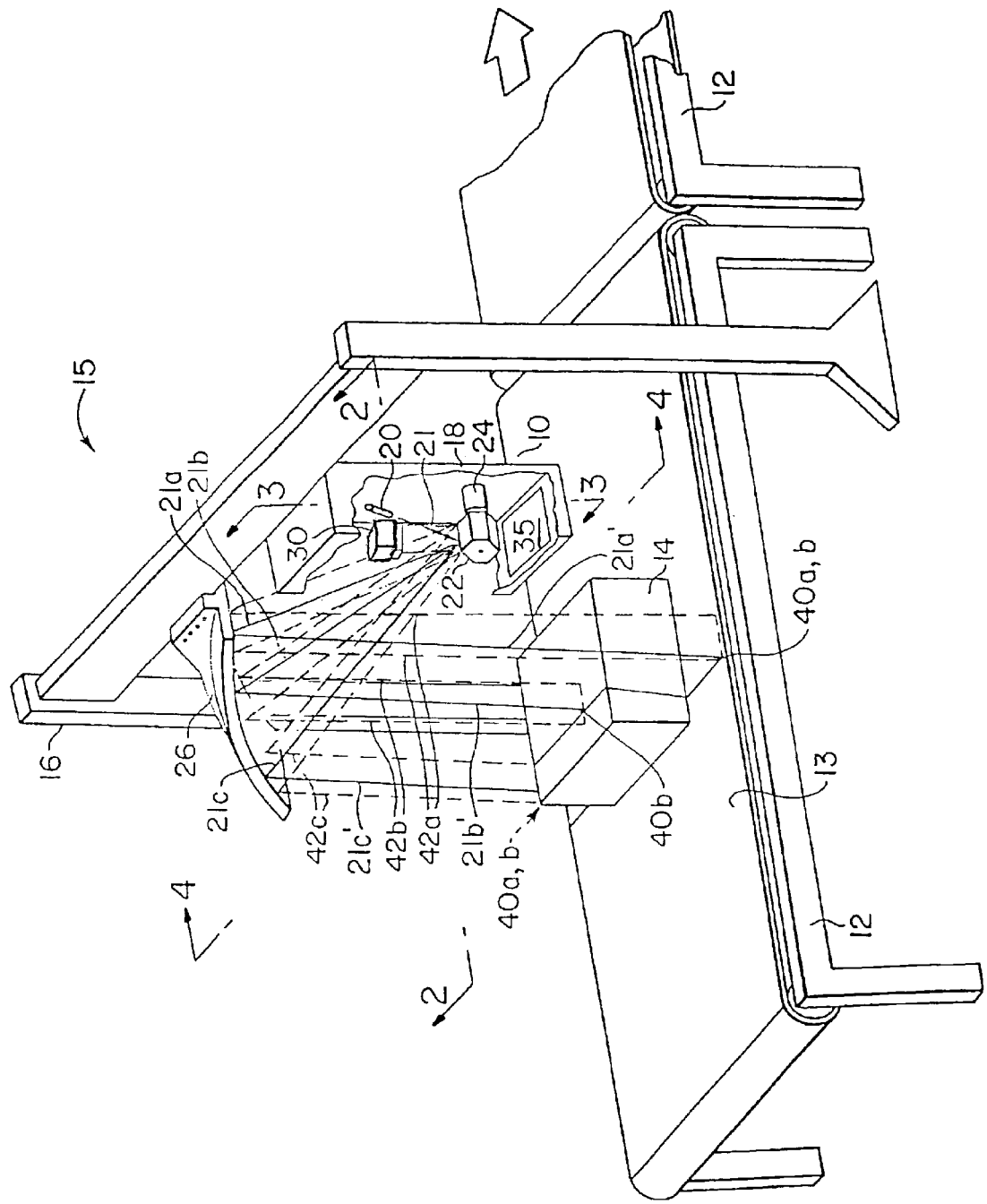
FIG. 1 is a perspective view of a dimensioning system in position above a conveyor.

The preferred embodiment will be described with reference to the drawing figures where like numerals represent like elements throughout.

A dimensioning system 15 in accordance with the present invention is shown in FIG. 1. The dimensioning system 15 is positioned above a conveyor section 12 carrying an object 14. The dimensioning system 15 is comprised of a main unit 10 and a parabolic reflecting surface 26. The dimensioning system is mounted on a stand 16 above a conveyor section 12 carrying an object 14. The main unit 10 is enclosed in a housing 18 which is made by conventional means of sheet metal or molded plastic. Only a portion of the housing 18 is illustrated in order to show the components of the dimensioning system 15 contained therein.

The dimensioning system 15 is comprised of a laser diode and lens assembly 20 mounted in the housing 18. The laser assembly 20 produces a coherent, collimated beam 21 which is directed toward a six-sided, multi-faceted mirrored wheel 22. The mirrored wheel 22 is driven by a motor 24, which moves the beam 21 as it is reflected from the turning mirrored wheel 22. This produces a series of continuous beams, which have been graphically represented by 21a, 21b and 21c. The series of beams 21a, 21b and 21c are directed toward a high quality, parabolic reflecting surface 26 which reflects the series of beams 21a, 21b and 21c to produce a scan of the conveyor belt surface 13 normal to the direction of travel.

Figure 4:
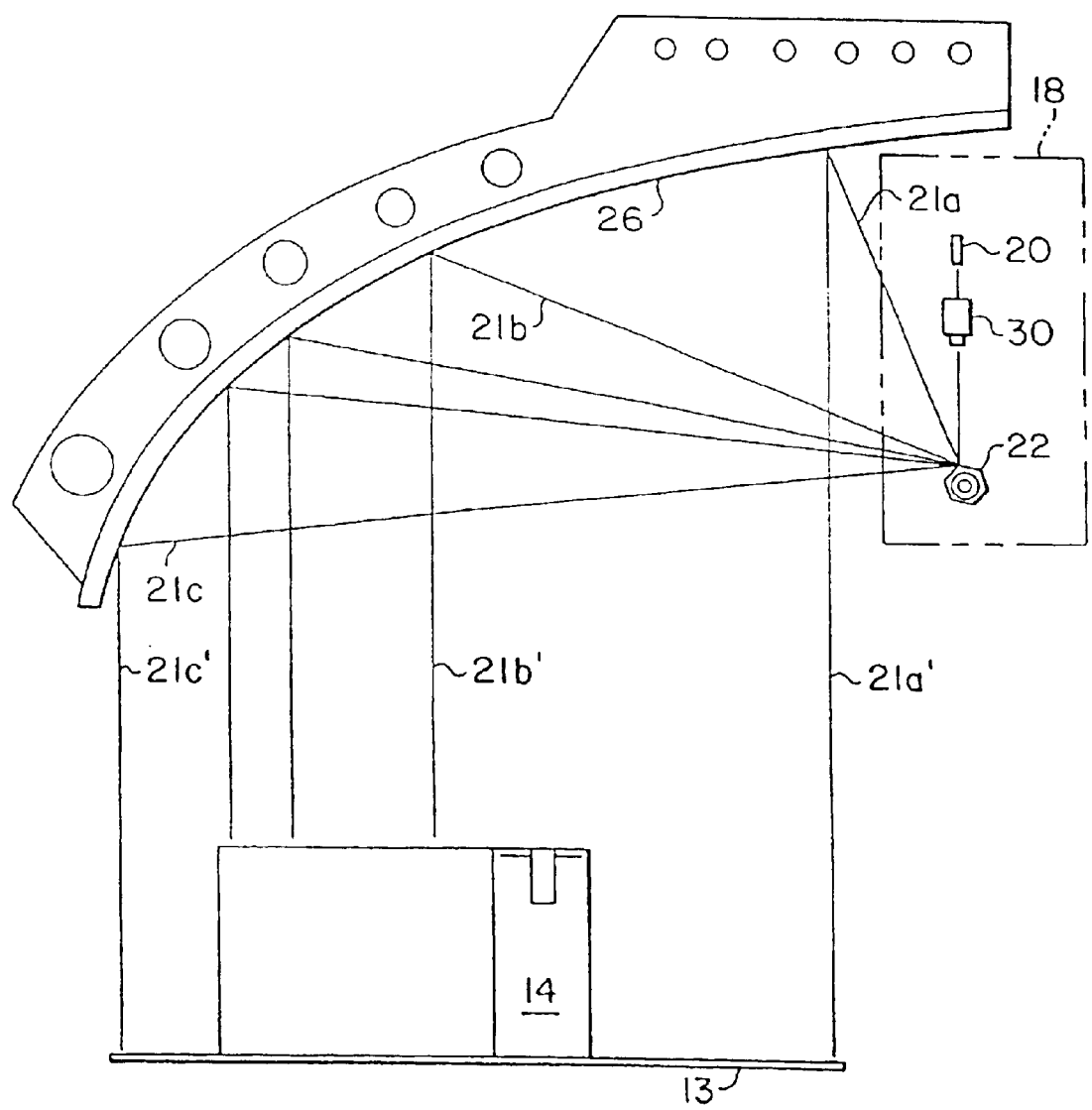
FIG. 4 is a view along line 4—4 in FIG. 1.

As graphically illustrated in FIG. 4, the parabolic surface 26 is used to produce parallel beams 21a', 21b', and 21c' from the mirrored wheel 22 and direct them onto the conveyor belt 13. The mirrored wheel 22 is located at the focus of the parabolic reflecting surface 26. If the laser beam 21 is moved directly from the mirrored wheel 22 to the belt 13, the scan beams would radiate from a point source and cast shadows from adjacent objects onto each other. By making the scan beams parallel from above, no shadowing occurs.

In the preferred embodiment, the laser diode/lens assembly is a Mitsubishi 35 mW, 690 nm laser diode with an aspheric glass lens having a 6.24 mm focal length. Referring back to FIG. 1, the motor 24 and the motor control circuitry 25 is designed to minimize motor drift. In the preferred embodiment, the motor speed is constantly 533 rpm.

A CCD (charged coupled device) line scan camera 30 is mounted in the housing 18 and directed toward the mirrored wheel 22. The camera 30 has a line field of view 42. As the mirrored wheel 22 turns, the line field of view 42 is directed to corresponding positions (represented as 42a, 42b and 42c) with the series of scan beams 21a, 21b and 21c. The camera 30 outputs a serial analog signal to the logic processor 35 mounted in the housing 18.

Figure 3:
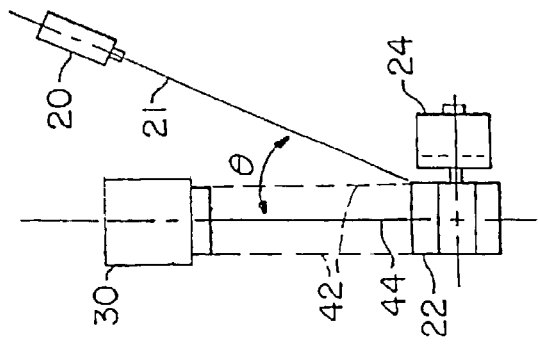
FIG. 3 is a view along line 3—3 in FIG. 1.
Figure 2:
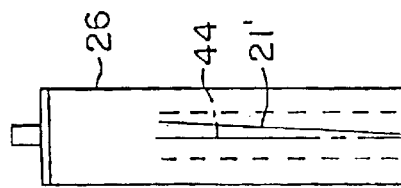
FIG. 2 is a section view along line 2—2 in FIG. 1.
Figure 2:

The mounting geometry of the laser assembly 20, camera 30, mirrored wheel 22 and parabolic reflecting surface 26 is shown in detail in FIGS. 2–4. The laser assembly 20 and the camera 30 are mounted on a plane which is parallel to the axis of the mirrored wheel 22. As shown in FIG. 3, the laser assembly 20 and the camera 30 are offset from each other by an angle θ which is approximately 5°. θ is defined by measuring the angle between the laser beam center 21 and the central axis 44 of the field of view 42 of the camera 30.

As shown in FIGS. 2 and 4, the mirrored wheel 22 sweeps the laser beam 21 across the parabolic reflecting surface 26, with approximately 90° of the swept beam 21 striking the parabolic reflecting surface 26. The parabolic surface 26 reflects the laser beam 21 to provide a series of parallel beams 21a', 21b' and 21c'.

The camera field of view 42 is aligned in the same plane as the laser beam 21 and is directed at the mirrored wheel 22. As shown in FIG. 2, the central axis 44 of the field of view 42 is reflected by the parabolic reflecting surface 26 to be approximately normal to the conveyor surface. The angle of the parallel laser beam 21' after reflecting off of the parabolic surface 26, remains θ from the central axis 44 of the camera field of view 42.

Figure 5:
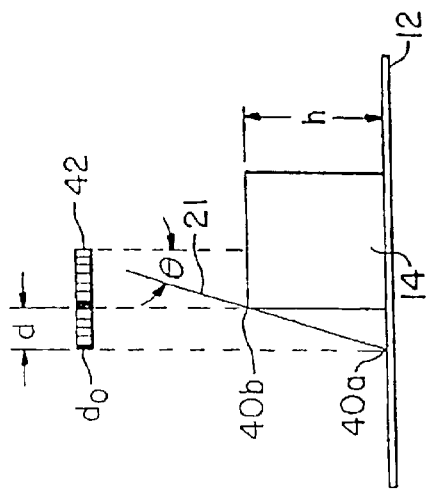
FIG. 5 is an explanatory diagram which indicates how the offset distance is measured and the height of the object is calculated.

The object height 14 at a given point is measured by triangulation using the angle θ. The offset angle θ between the laser beam 21' and the normal camera view field 42 above the conveyor creates a horizontal offset d between intercept point 40a where the laser beam normally intercepts the conveyor surface and image point 40b when the laser beam 21 strikes an object 14. As shown in FIG. 5, the offset d is captured by the linear view field 42 of the camera 30. When the intercept point 40a and the image point 40b are the same, i.e. when no object is present, the image is oriented to fall at one end of the CCD linear array $d_0$. As an object comes under the scan beam 21, the image point 40b moves toward the other end of the CCD array based on the object height at that discrete point on the conveyor belt. The calculation of offset d, the distance from $d_0$, is explained in more detail hereinafter.

Figure 6:
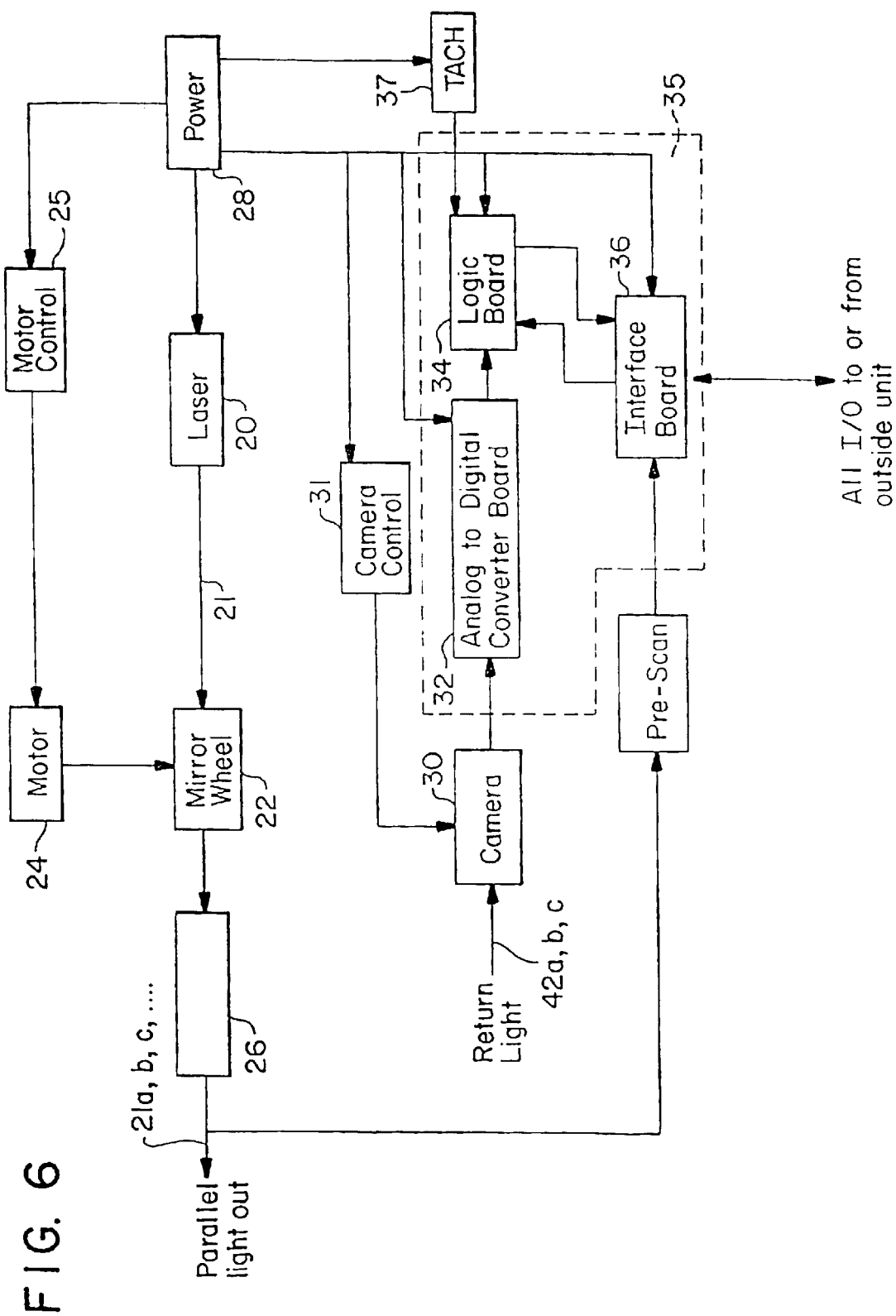
FIG. 6 is a block diagram of the system.

The output of the camera 30 is fed to the input of the A/D (analog to digital) converter 32 as shown in FIG. 6. The A/D output is a binary digital pulse corresponding to the position of the laser spot.

In the preferred embodiment, the line scan camera 30 is a Dalsa model CL-C3. The lens has a focal length of 170 mm. To maintain focus over a 914.4 mm (36 inch) depth of field, the CCD array is tilted at an angle in relation to the median plane through the lens. The angle of tilt is determined using the Scheimpflug condition. The angle is dependent on the focal length of the lens and the plane angle of the object. The plane angle of the object is projected towards the lens. The median plane of the lens is extended to intersect the object plane's extended line. The image plane's line is similarly extended to intersect at the same point. For the three lines to intersect, the image plane must be angled. The angle that causes the three extended lines to intersect is the Scheimpflug angle. The angular relationship is achieved by the spacial relationship and orientation between the object on the conveyor, the reflected light path, and lens and CCD array. The CCD array must then be slightly offset such that the object sample points are imaged onto the active area of the CCD array. The use of the Scheimpflug condition allows for a smaller reflected laser spot size over the entire depth of field. This yields increased resolution.

The CCD array contains 512 pixels. The maximum scan height is 914.4 mm (36 inches), which yields a resolution of 1.778 mm (0.07 inch) per pixel. The camera 30 takes between 28 and 55 microseconds to integrate and clock out the pixels after integration. 28 microseconds is the minimum amount of time to clock out the signal.

The camera control circuitry consists of a pixel clock and a cycle clock. The cycle clock controls the integration time and the pixel clock controls the rate at which the pixels are clocked out. The cycle clock is synchronized with the scans such that it pulses 240 times (per scan) as it moves across the conveyor belt surface (at 6.35 mm (0.25 inch) increments) starting at scan zero (the conveyor belt edge). The pixel clock is synchronized with the A/D converter to admit the serial data stream.

A block diagram of the dimensioning system 15 is shown in FIG. 6. The components required to output parallel light and to receive the return light have been described above.

After the camera 30 receives the return light, the CCD light-sensitive pixels accumulate a charge proportional to the intensity of the exposure. The output is an analog waveform where the voltage is proportional to the intensity of return light. The laser spot can be modeled with a Gaussian distribution. It is then input to the processor 35.

The processor 35 is comprised of an A/D converter 32 which accepts the analog signal from the camera 30 and outputs a digital signal. The converter uses a fixed level comparator circuit to digitize the analog waveform from the camera 30. In the first stage of the A/D process, the incoming signal is filtered from unwanted noise and amplified. The following stages provide variable gain. The final section performs the A/D conversion which produces a binary output pulse.

The logic board 34 accepts the binary signal from the A/D converter 32. The signal is a single pulse corresponding to the reflected image point detected by the CCD array in the camera 30. When the LVAL output from the scanner is set high (a signal that indicates the camera is clocking out its pixels) the leading edge is used as a starting point to measure the distance to the laser spot pulse. Two 12 bit, 60 MHz counters are started at the rising edge of the LVAL signal. The first counter is stopped and stored in memory at the leading edge of the laser spot pulse indicating the laser beam image point 40b, and the second counter is stopped and stored in memory at the falling edge of the signal. The processor 35 calculates the difference between the edge values and this represents the center of the laser beam image point 40b. This number is converted to a distance d that the laser image point 40b is apart from the conveyor intercept point 40a $d_0$. Using this distance d and the angle θ, the box height is calculated.

The height h is calculated by the logic board 34 using the simple trigonometric relationship:

$$h = \frac{d}{\tan\theta}. \quad \text{(Eqn. 1)}$$

This relationship can be grouped with the conversion of the counters to a distance in one step. By doing this for each point, the center count can be converted directly to a height. By creating a lookup table, any variation between units in processing can be calibrated out.

Each time d is measured, the height h is calculated at that discrete point. Measurements of the beam image points are taken as the scan progresses across the conveyor 12 at preferably 0.25 inch intervals. This yields 240 discrete sample image points per scan. A tachometer 37, measures the conveyor belt speed, and based on the scan frequency, the distance between scans is calculated.

Each sample image point is composed of an x,y,z component. The x component is the distance, in discrete 0.0625 inch increments, obtained from counting the tachometer pulses. The y component is the distance, in discrete 0.25 inch increments, from the scan zero side of the conveyor. The z component is the object height h, in 0.0625 inch increments, from the belt towards the parabolic reflecting surface as measured by the laser-camera interaction.

Figure 7:
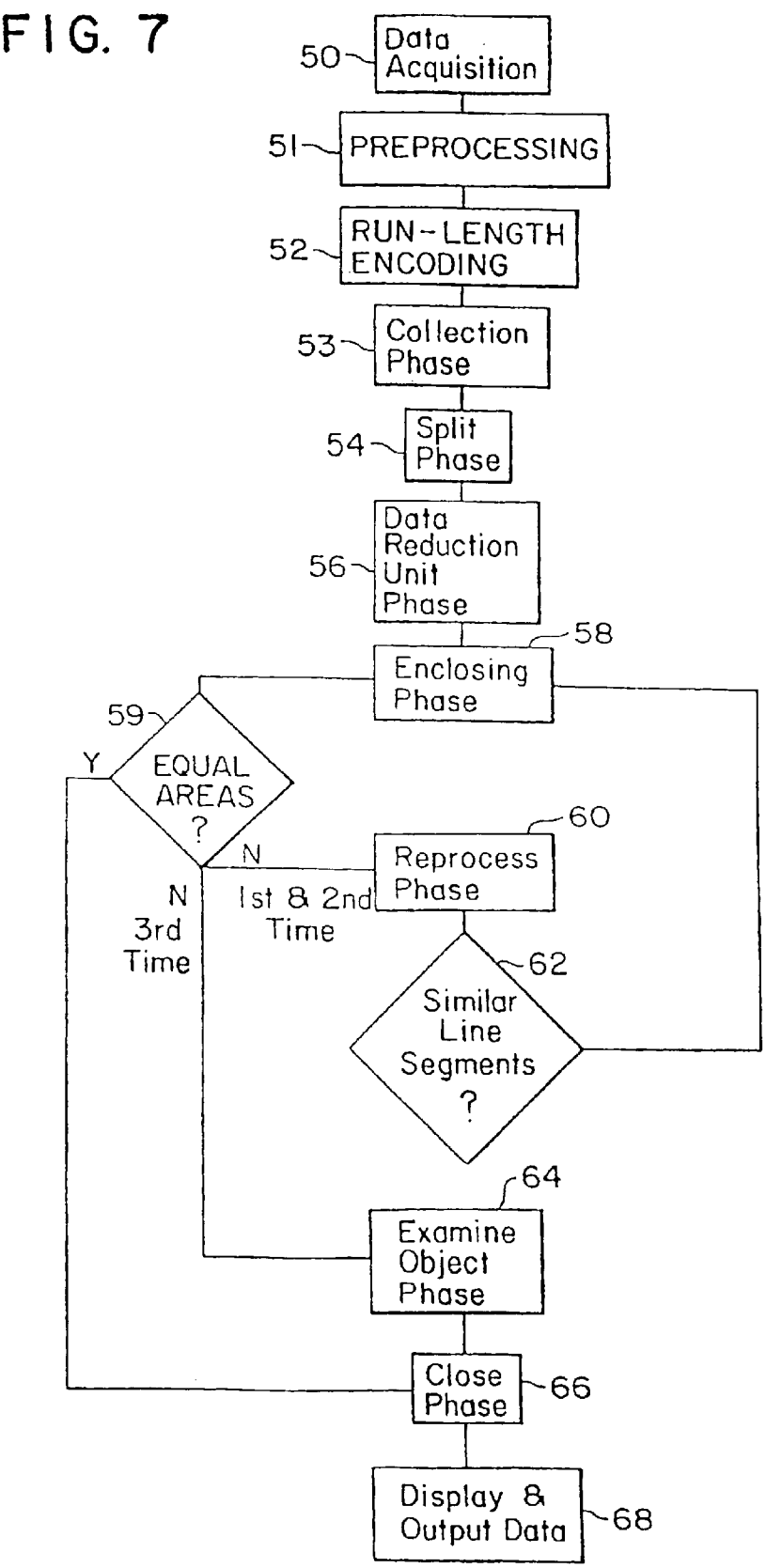
FIG. 7 is a flow chart of the enclosing process.

As shown in the flow diagram of FIG. 7, once the data is acquired (step 50), it is processed to define a box structure. After a scan has been completed, the data from the 240 sample points are fed into a preprocessor function (step 51) in the software. The purpose of the preprocessor is to convert the raw height data from the camera into 0.07 inch increments, and to remove calibrated aberrations from the data. For example, if sample image point number 5 is always 2 counts larger than the average, the data contained in sample 5 will be lowered by 2 counts.

Once the preprocessor has normalized the data, it is fed into a run-length encoder module (step 52). The run-length encoder takes the 240 discrete height samples and converts the entire scan into multiple line segments. Line segments are constructed from groups of adjacent sample image points with similar non-zero heights that lie on the same scan line. Each line segment is defined by its starting position on the conveyor belt, length, and height. Line segments are no longer discrete, their components are averages of the discrete points they were built from. As shown in the flow diagram, after the data is acquired, and preprocessed, the line segments are then passed to the collection phase. During the data collection phase, the incoming line segments are assigned to a particular box structure according to their position to the previously gathered line segments.

During the collection phase (step 53) individual line segments may contain information for more than one object. If the data for the second object is apparent due to trends in the previously gathered data, the line segment will be broken into two line segments and assigned normally. If the line segment cannot be broken it will be assigned normally to the closest matching box structure, therefore this box structure will now contain the information for more than one object, the split phase (step 54), and examine object phase (step 64) should remove this extra information later on.

If during a particular data collection period a box structure did not receive at least one single line segment, indicating the absence of the object in the current scan line, that box structure is passed to the split phase.

During the split phase (step 54), the software examines the outer edges of the image defined by the box structure. If the split module notices drastic changes in the slope of line segments contained in the box structure, the module will break the box structure down into multiple box structures. Each of these box structures will contain tag information to rebuild the original box structure if the slopes were misinterpreted. All of this data will then pass to the data-reduction-unit.

During the data reduction unit phase (step 56), all line segments that do not touch the edges of the calculated box structure image are deleted. This is accomplished by deleting any line segment where the end points do not touch or exceed the previous or next scan line segment's end points. This decreases the processing time during the enclosing phase.

The enclosing phase (step 58) encloses the imaged object within the smallest box structure. To enclose the object, the angular orientation of a first side must be determined and then two perpendicular sides and an opposing parallel side are calculated such that the area within is minimized and contains all of the line segments. In order to determine the angular orientation of a first side, points are defined from the line segment data comprising the box structure.

Figure 8A:
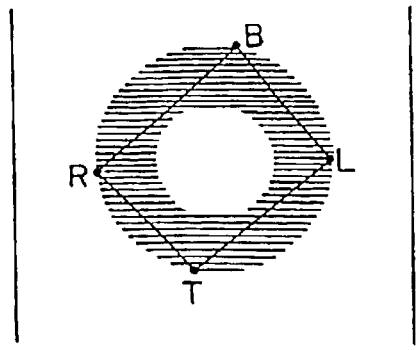
FIG. 8A is an illustration of how the enclosing process determines the first four points.

As shown in FIG. 8A, the T point is the beginning of the first line segment in the box structure, and has the minimum x value. The B point is the end of the last line segment, and has the maximum x value. The R point is the beginning of the line segment closest to the scan zero point, i.e. the minimum y value. The L point is the end of the line segment farthest from scan zero, i.e. the maximum y value.

After these four points, T, R, B, and L, are determined, line segments are computed. For reference, the center of the box structure is taken as the point midway between the maximum and minimum x and y values.

Figure 8B:
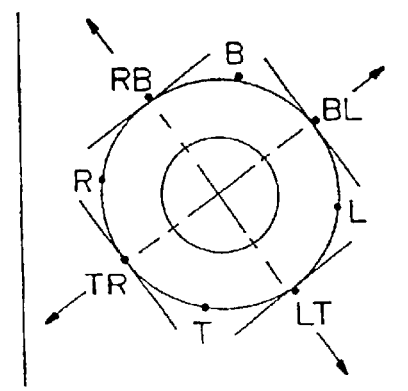
FIG. 8B is an illustration of how the enclosing process determines the second four points.

As shown in FIG. 8B, the line segments $\overline{TR}, \overline{RB}, \overline{BL}$, and $\overline{LT}$ are moved tangentially away from the center until they enclose all of the individual line segments defining the box structure. The last sample point where each of the computed tangential lines touch a line segment of the box structure defines four new points; TR, RB, BL and LT.

The final part of the enclosing phase involves defining 16 lines, each having its own angular orientation, by the eight points. The first area is comprised of 8 lines defined between each adjacent point, T and TR, TR and R, R and RB, etc. The second eight lines are defined between every other point, TR and RB, RB and BL, BL and LT, etc. and T and R, R and B, B and L, etc.

Figure 8C:
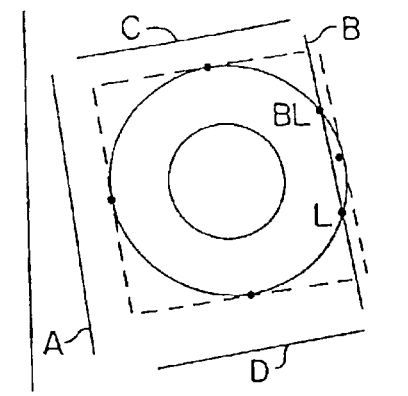
FIG. 8C is an illustration of how the enclosing process boxes a box structure.

Each of the computed lines defines an angle with respect to the conveyor width and running length. For example with respect to the line defined by points BL and L as shown in FIG. 8C, an exaggerated line A is computed parallel to line BL to L, and is moved in from outside of the box structure until it contacts a sample point. Line B is computed parallel to line A and is moved in from the side opposite A. Two additional lines normal to lines A, B are computed, C, D and are moved in to box the box structure. This operation is performed for each of the sixteen lines computed above. The smallest area computed that encloses the box structure is output to the next phase.

A check is performed by calculating the area of the box structure based on all of the edge points and the area within the lines defining a box. If the two areas are approximately equal (step 59), the box is then closed, otherwise the box is sent to a reprocessing phase.

During the reprocessing phase (step 60) any extraneous line segments that are not similar (step 62) to the adjacent segments are adjusted until they match adjacent data. The box structure is then passed back to the enclosing phase. If the box structure has been through the reprocessing phase previously, it passes to the examine object phase.

Figure 8D:
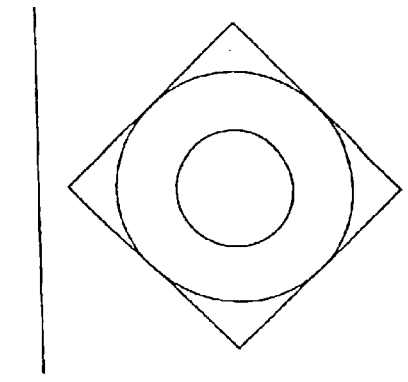
FIG. 8D is an illustration of the examine objects phase.

The examine object phase (step 64) examines the data and recreates a silhouette picture of the object(s) that were scanned. As shown in FIG. 8D, box structures reaching this phase are of irregularly shaped objects, objects touching other objects or objects oriented in such a fashion that the standard process could not accurately enclose them. This phase of the process allows for proper enclosure of tires and separates complex arrangements of touching objects.

The examine object phase (step 64) of the method generates outlines of the box structures and examines these outlines looking for corners. Concave corners and corners that indent into the box structures are noted. The corners are connected to form sides of boxes, and matching concave corners are connected to split apart multiple box structures where they meet. The new, individual box structures are then enclosed within the smallest rectangle possible.

The final step of the process is the close phase (step 66) where the box data is displayed and transmitted to a peripheral device.

It will be recognized to those of ordinary skill in the art that the enclosing process can be tailored to specific applications where known parameters exist. For example, where it is known that only rectangular box-shaped objects will be scanned, the comparison done in step 59 can be made based on a higher approximation of equality since the area of the box structure based on all of the edge points should nearly equal the area of the lines defining the box. Additionally, if it is known that all items being scanned have a uniform height, but different items may have a significantly different height, the split phase step 54 may be configured to look for variations in the uniformity of line segment height as one way to determine the existence of two box structures occurring within the same set of scans.

The software also corrects for offsets in the mirrored wheel facets and for changes in the measured height which are caused by the uneven distances between the mirrored wheel and the surface of the conveyor. As shown in FIG. 4, the scan beam length 21a is greater than the scan beam length 21b. This difference in length follows a simple trigonometric relationship which is programmed into the software.

The memory on the logic board 34 is large enough to store the relevant data and some of the frequently used program code. In the preferred embodiment, there are four 256K×32 SRAM modules on board. A preferred processor for implementing the software is a Texas Instruments TMS320C30 CMOS digital signal processing integrated circuit.

An error count is kept to log the number of times a sample had to be eliminated because of multiple transitions. The quality of the measurement is also recorded. A scale from 1 to 99 indicates the confidence level that the dimensions are accurate. If there is any doubt about the dimensions, it will be assigned a lower number. This number can be used as a threshold to determine whether the dimensions are accurate enough to be used for billing.

Figure 9:
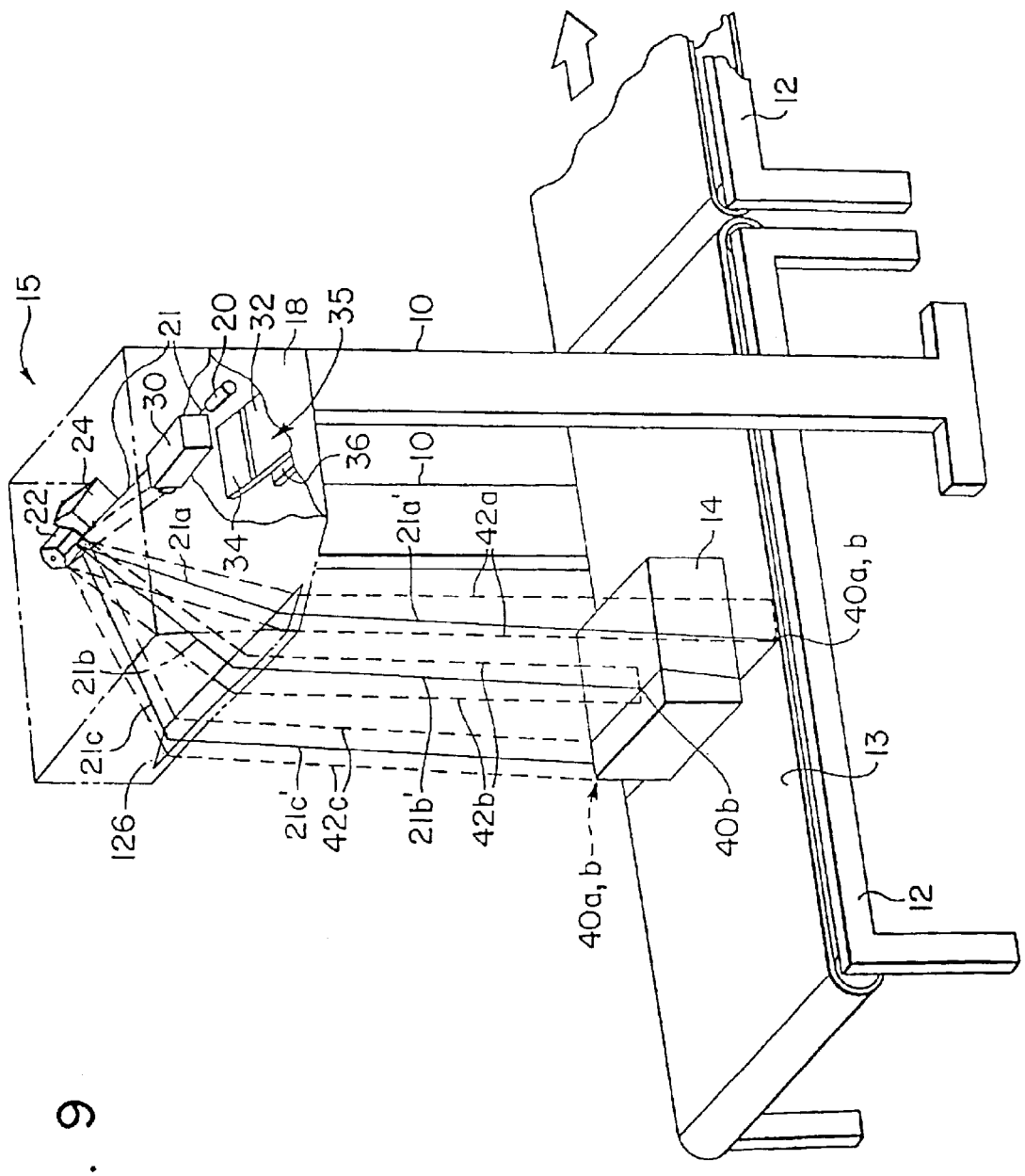
FIG. 9 is a perspective view of an alternative embodiment of the dimensioning system.

While the preferred embodiment utilizes a parabolic reflecting surface 26, an alternative embodiment could use a transmission hologram 126 to collimate the laser beam as shown in FIG. 9. A Fresnel lens could also be used to collimate and refract the individual laser beams in a scan to be approximately parallel to one another.

It is also possible to replace the parabolic reflecting surface 26 with two flat mirrors to approximate a parallel scan. The scan is divided into three parts. The central portion is a direct scan from the mirrored wheel toward the central portion of the conveyor. Because the width of the central portion is limited, shadowing is minimized. The other two portions of the scan will cover the outer portions of the conveyor. Two flat mirrors are angled above the rotating mirrored wheel. The light travels upwards to the mirror and is then reflected down to the conveyor in a near parallel scan. The flat mirrors are approximating the outer regions of a parabola, with the center portion being replaced by a direct scan from the mirrored wheel. This arrangement requires the software to be more complex to correct for the distance and angle changes caused by the additional mirrors and the divided scan.

It is also possible to replace the parabolic surface 26 with a multi-faceted parabolic surface to approximate a parallel scan. The scan is divided into discrete parts. The light travels upwards to the mirror segments and then is reflected down to the conveyor in a near parallel scan. The mirror facets are approximating a true parabolic surface. This arrangement requires the software to be more complex to correct for the distance and angle changes caused by the additional mirrors. In this alternative embodiment, 479 samples are acquired per scan.

Figure 10:
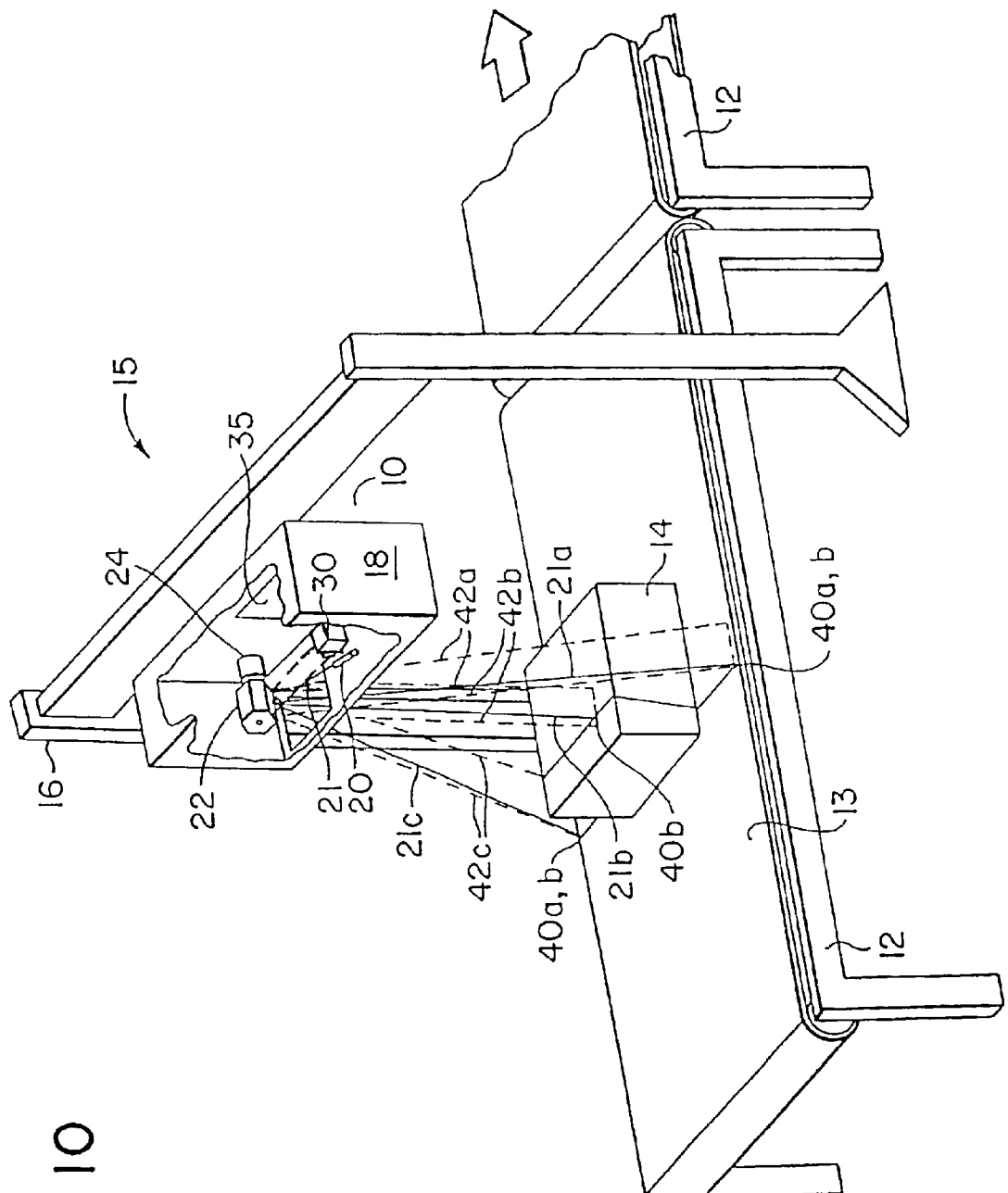
FIG. 10 is a perspective view of a second alternative embodiment of the dimensioning system.

If there is no possibility that more than one object will be present during scanning, no reflecting surface is required. As shown in FIG. 10, the main unit 10 may be used solo with no reduction in accuracy. With only one object under the system at a time, no shadowing can occur. In this situation parallel scanning is unnecessary and the raw, angular scan becomes the preferred embodiment. No external optics are needed and system cost and size can be reduced.

While the preferred embodiment uses a line scan camera, an alternative embodiment could use a PSD (position-sensitive detector). The PSD outputs a current which is relative to where the reflected laser spot is detected. The processing of the output is simplified since the output current relates position without having coefficient luminance information present.

While the present invention has been described in terms of the preferred embodiment, other variations which are within the scope of the invention as outlined in the claims below will be apparent to those skilled in the art.

We claim:

1. An apparatus for measuring an object on a support surface comprising:
    a chassis;
    a rotatable, multifaceted mirror wheel located on the chassis;
    a light source located on the chassis to selectively strike a facet of the mirror wheel;
    a reflective surface located on the chassis at a known distance from the support surface, the reflective surface receives light reflected from the selected facet of the mirror wheel, directs that light toward an object on the support surface, receives light reflected from the object and directs it back to the selected facet which redirects the reflected light;
    a detector located on the chassis with a field of detection that includes the selected facet, detects redirected light from the selected facet and outputs a signal that identifies a point of contact with the object; and
    a processor that receives the signal and establishes a measurement of distance between the support surface and the point of contact with the object.

2. The apparatus of claim 1, wherein the reflective surface is parabolic with a concave light receiving side that reflects the light toward the support surface at a predetermined nonzero angle relative to a perpendicular extending from the support surface.

3. The apparatus of claim 1, wherein the light source emits a light beam at a fixed orientation relative to the chassis that is converted to a moving light beam by the mirrored wheel such that when the moving light beam leaves the mirrored wheel toward the reflective surface, the moving light beam rotatably sweeps through an arc of a circle, the reflecting surface changing the moving light beam from sweeping rotatably through the arc of a circle to anther type of moving light beam that moves laterally through a plane, when the object is positioned on the support surface, the other moving light beam moves across the support surface and the detector registers a plurality of points of contact along the object.

4. The apparatus of claim 3, wherein the reflective surface is fixed in position and directs the light toward the support surface at a nonzero angle relative to a perpendicular thereto.

5. The apparatus of claim 4, wherein the field of view which intersects the support surface remains centered about the perpendicular.

6. The apparatus of claim 4, wherein the light source and the detector are oriented toward the selected facet of the mirrored wheel and positioned offset from each other by an angle of less than ninety (90) degrees.

7. The apparatus of claim 3, wherein the light source and the detector are oriented toward the selected facet of the mirrored wheel and positioned offset from each other by an angle of less than forty-five (45) degrees.

8. The apparatus of claim 3, wherein the processor calculates a height value for each of the plurality of points of contact, stores data from the plurality of points of contact, and compares the data to provide a three dimensional measurement of an object on the supporting surface.

9. The apparatus of claim 8, wherein the supporting surface is a conveyor.

10. The apparatus of claim 3, wherein the detector is a line scan camera that transmits a path-height-profile-measurement-signal which represents a height of the object along a linear section of the support area.

11. The apparatus of claim 10, wherein the transport of the object on a conveyor which forms part of the support surface allows the path-height-profile-measurement-signal to be used to determine a height and width of the object.

12. A method of measuring an object on a support surface, comprising:
    emitting a fixed light beam in a fixed orientation toward a selected facet of a multifaceted, rotatable, mirrored wheel that reflects the fixed light beam as a moving light beam that rotatably sweeps through an arc of a circle;
    redirecting the moving light beam using a reflective surface such that the rotatable sweeping of the moving light beam through an arc of a circle is converted to a modified moving light beam that moves laterally through a plane across the support surface;
    detecting a plurality of points of contact that occur within a detector field of view, wherein the detector field of view and the fixed light beam are initially oriented directly toward and redirected by the selected facet of the mirrored wheel; and
    calculating height data that corresponds to each of the plurality of points of contact to determine a height profile across a linear section of the measuring area.

13. The method of claim 12, wherein the modified moving light beam impacts the support surface at an angle relative to a perpendicular thereto and the field of view impacts the support surface generally along the perpendicular.

14. The method of claim 12, further comprising transporting the object on a conveyor which forms at least part of the support surface such that the modified moving light beam moves across the conveyor so that a detector can register a plurality of points of contact along the object and/or the support surface.

15. The method of claim 14, further comprising storing data from the plurality of image points and comparing the data to provide a three dimensional measurement of the object in the measuring area.

16. The method of claim 12, further comprising providing a light source and a detector that are oriented directly toward the selected facet along an unobstructed path and are offset from each other by an angle of less than ninety (90) degrees.

17. The method of claim 16, wherein the step of providing the detector comprises providing a line scan camera that transmits a path-height-profile-measurement-signal which represents a height of the object along the linear section of the measuring area.

18. The method of claim 17, further comprising determining if the path-height-profile-measurement-signal represents one or more objects.

19. The method of claim 18, further comprising transmitting a signal corresponding to the number of objects identified by the path-height-profile-measurement-signal.

* * * * *

UNITED STATES PATENT AND TRADEMARK OFFICE
CERTIFICATE OF CORRECTION

PATENT NO. : 6,775,012 B2 Page 1 of 1
DATED : August 10, 2004
INVENTOR(S) : Wurz et al.

It is certified that error appears in the above-identified patent and that said Letters Patent is hereby corrected as shown below:

Column 9,
Line 43, after the word "to", delete "anther" and insert therefor -- another --.

Signed and Sealed this

Fourth Day of January, 2005

JON W. DUDAS
*Director of the United States Patent and Trademark Office*